Figure 1:
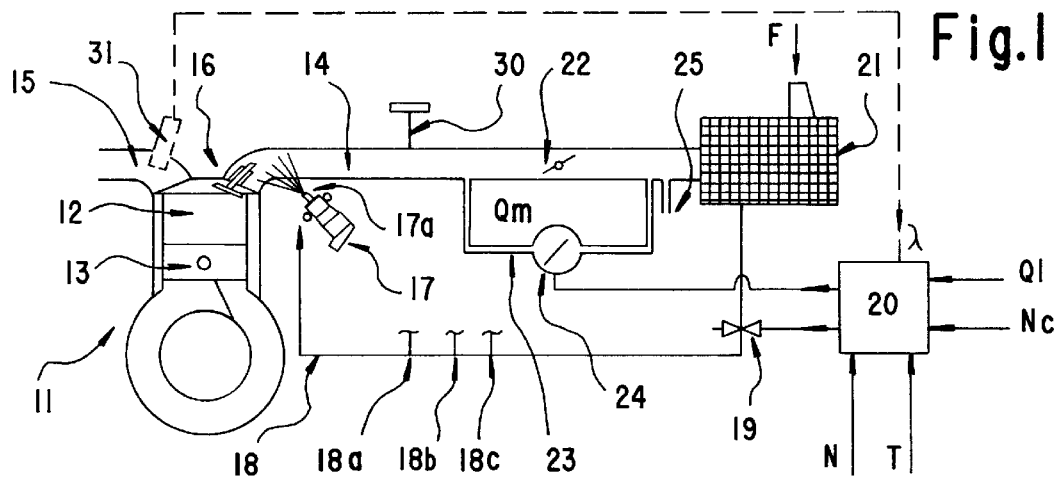

United States Patent
Atanasyan

[19]

[11] Patent Number: 5,809,965
[45] Date of Patent: Sep. 22, 1998

[54] METHOD FOR CONTROLLING THE GOOD OPERATION OF THE AIR ASSISTANCE TO A FUEL INJECTOR OF AN INTERNAL COMBUSTION ENGINE, AND CORRESPONDING DEVICE

[75] Inventor: Alain Atanasyan, Tournefeuille, France

[73] Assignee: Siemens Automotive S.A., Toulouse Cedex, France

[21] Appl. No.: 793,182
[22] PCT Filed: Jul. 27, 1995
[86] PCT No.: PCT/EP95/02989
§ 371 Date: Feb. 3, 1997
§ 102(e) Date: Feb. 3, 1997
[87] PCT Pub. No.: WO96/04473
PCT Pub. Date: Feb. 15, 1996

[30] Foreign Application Priority Data

Aug. 1, 1994 [FR] France ................................. 94 09613

[51] Int. Cl.$^6$ ........................................... F02D 41/22
[52] U.S. Cl. .................. 123/339.15; 123/690; 123/585; 73/119 A
[58] Field of Search .................. 123/339.15, 690, 123/479, 531, 585; 73/119 A

[56] References Cited

U.S. PATENT DOCUMENTS 5,289,808  3/1994  Takahashi et al. ................... 123/421
5,487,372  1/1996  Iida et al. ............................. 123/479

FOREIGN PATENT DOCUMENTS 0 529 642A2  3/1993  European Pat. Off. .
5-263734  10/1993  Japan .

OTHER PUBLICATIONS

Patent Abstracts of Japan, abstract of JP 7-151040, Yoshihara et al, Jun. 13, 1995.
Patent Abstracts of Japan, vol. 18, No. 34, (M-1544), Jan. 19, 1994, for JP 5-263734 (Itakura et al), Oct. 12, 1993.

Primary Examiner—Andrew M. Dolinar
Attorney, Agent, or Firm—Herbert L. Lerner; Laurence A. Greenberg

[57] ABSTRACT

The present invention relates to a process for controlling the proper operation of an air-assisted injector (17) during the start-up phase of an internal combustion engine (11). This injector is adapted to deliver a predetermined quantity of fuel to the engine. The process according to the invention is characterized in that it comprises:

a verification a posteriori, during a stabilized idle phase, that a predetermined quantity of air can be injected during the air assistance phase.

The present invention also relates to a device which implements this process and is particularly applicable to the field of automotive electronics.

9 Claims, 3 Drawing Sheets

METHOD FOR CONTROLLING THE GOOD OPERATION OF THE AIR ASSISTANCE TO A FUEL INJECTOR OF AN INTERNAL COMBUSTION ENGINE, AND CORRESPONDING DEVICE

BACKGROUND OF THE INVENTION

Field of the Invention

The present invention relates to a process for controlling the proper operation of the air assistance to a fuel injector.

In an internal combustion engine, it is important for the air/fuel mixture to be as homogeneous as possible in order to guarantee proper combustion and good performance in the engine.

It is well known to inject air at the level of the injector nozzle in order to improve the homogeneity of the air/fuel mixture. This air assistance creates an area of turbulence which makes it possible to break up the droplets of injected fuel. Thus, the fuel droplets are smaller in size and more numerous in a given quantity of fuel. The contact surface between the air and the droplets is substantially increased. The result of this air assistance is a better combustion of the mixture, less pollution, a reduced starting time for the catalyst, an engine torque which is maintained at an optimal level even when the richness of the mixture is less than 1 (during the start-up phase of the engine).

Because of this, air assistance is utilized with increasing frequency in strategies for controlling an internal combustion engine. This air assistance is quite often limited to the start-up phase of the engine and is not continued when the engine is hot, since in this case it causes an additional air flow which can disturb the engine (for example during a return to the engine idling mode).

The new standards (particularly American) regarding the control of the emission of pollutants by automobiles require not only that the conditions for the combustion of the air/fuel mixture be optimal, but that the proper operation of the devices which allow this optimal combustion is monitored continuously. Because of this, it is necessary to ensure that the device for air assistance to the injection is operating properly.

The object of the present invention is to design a process and a device for controlling the proper operation of the air assistance. However, its intent is not to add additional sensors so as not to increase the cost and complicate the embodiment of the electronic computer associated with the engine.

To this end, the present invention relates to a process for controlling the proper operation of an air-assisted injector during the start-up phase of an internal combustion engine.

This injector is adapted for delivering a predetermined quantity of fuel to the engine. The process according to the invention is characterized in that it consists of:
  verifying a posteriori, during a stabilized idle phase, that a determined quantity of air can be injected during the air assistance phase.

This verifies the proper functioning of the air supply device by verifying that a certain quantity of air can be introduced. This verification takes place apart from the air assistance phase, during a stabilized idle phase. Because of this, it is not necessary to use additional sensors, since it advantageously uses the sensors which are already used to adjust the idle.

Preferably, in order to complete the verification of the proper operation of the air assistance, it is also verified that the engine is supplied with a lean air/fuel mixture during the air assistance phase. To this end, a richness measuring probe (already present in any electronically controlled motor) is used to verify that a lean mixture is burned during the entire air assistance phase. Of course, when this probe detects a rich mixture, an air assistance system failure code is emitted in order to inform the driver.

Figure 2:
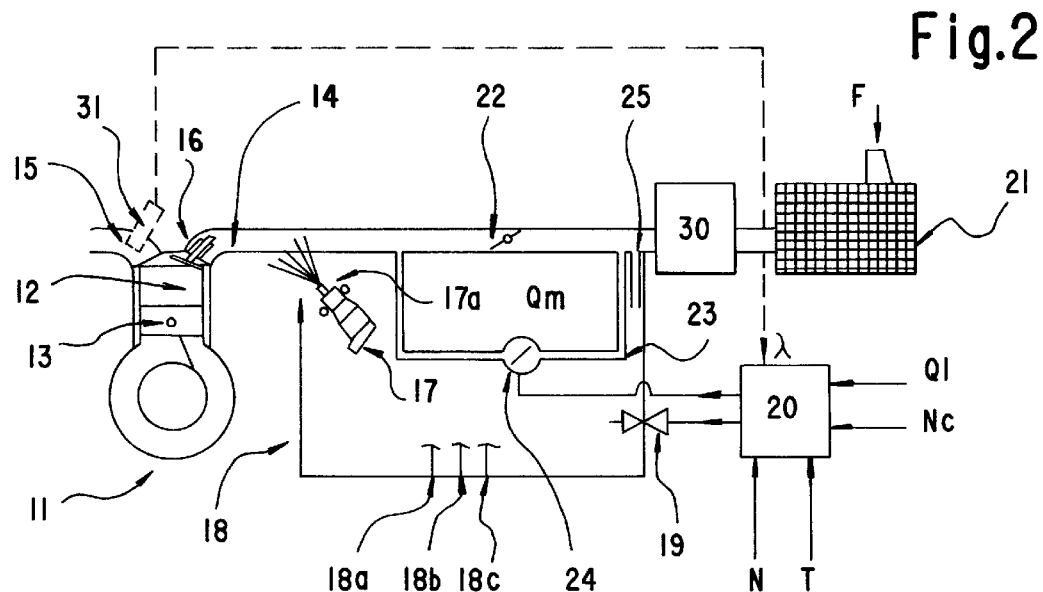
Figure 3:
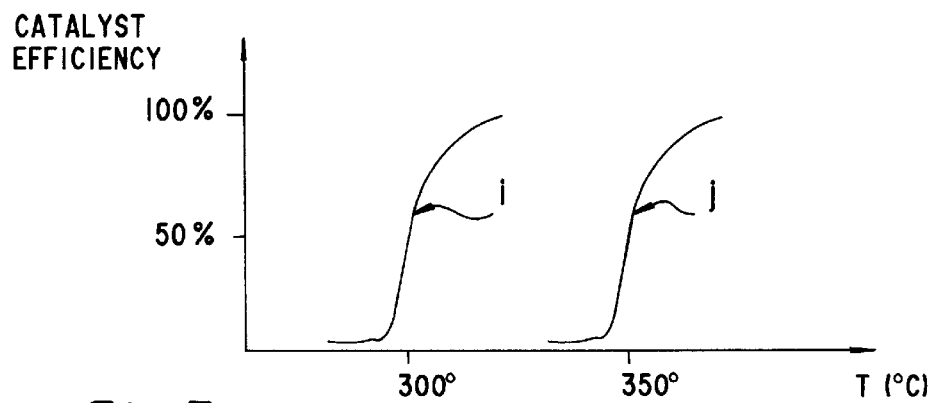

Other objects, characteristics and advantages of the present invention are described, by way of non-limiting examples, in the following description in reference to the appended drawings, in which:

FIG. 1 is a schematic view of an internal combustion engine equipped with an air assistance system, in which a pressure sensor is placed after a butterfly valve, FIG. 2 is a schematic view analogous to FIG. 1, in which an air intake flowmeter is placed immediately downstream from an air filter, FIG. 3 shows a graph of the efficiency of the catalyst as a function of the temperature of the exhaust gas.

Figure 4:
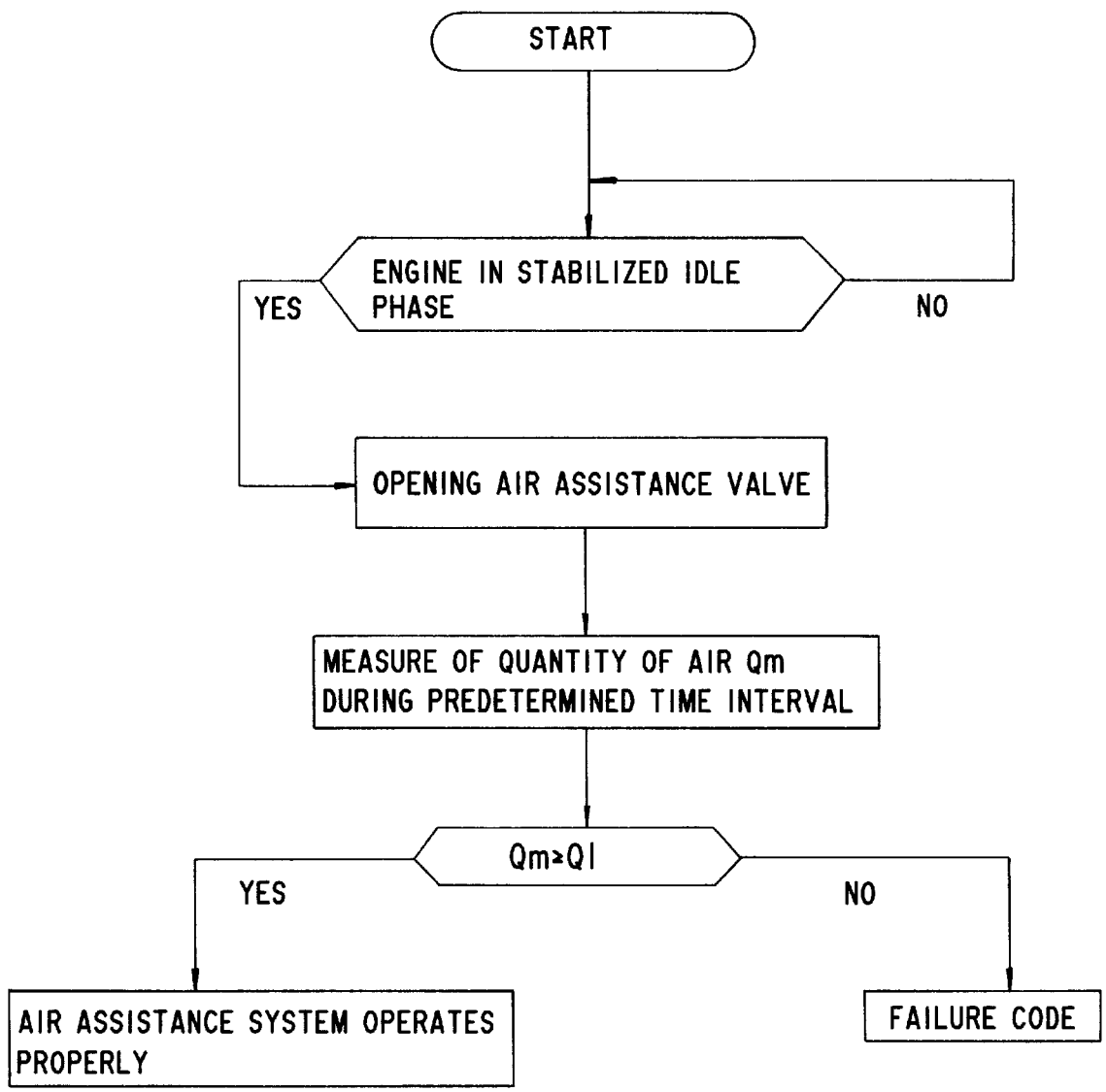
Figure 5:
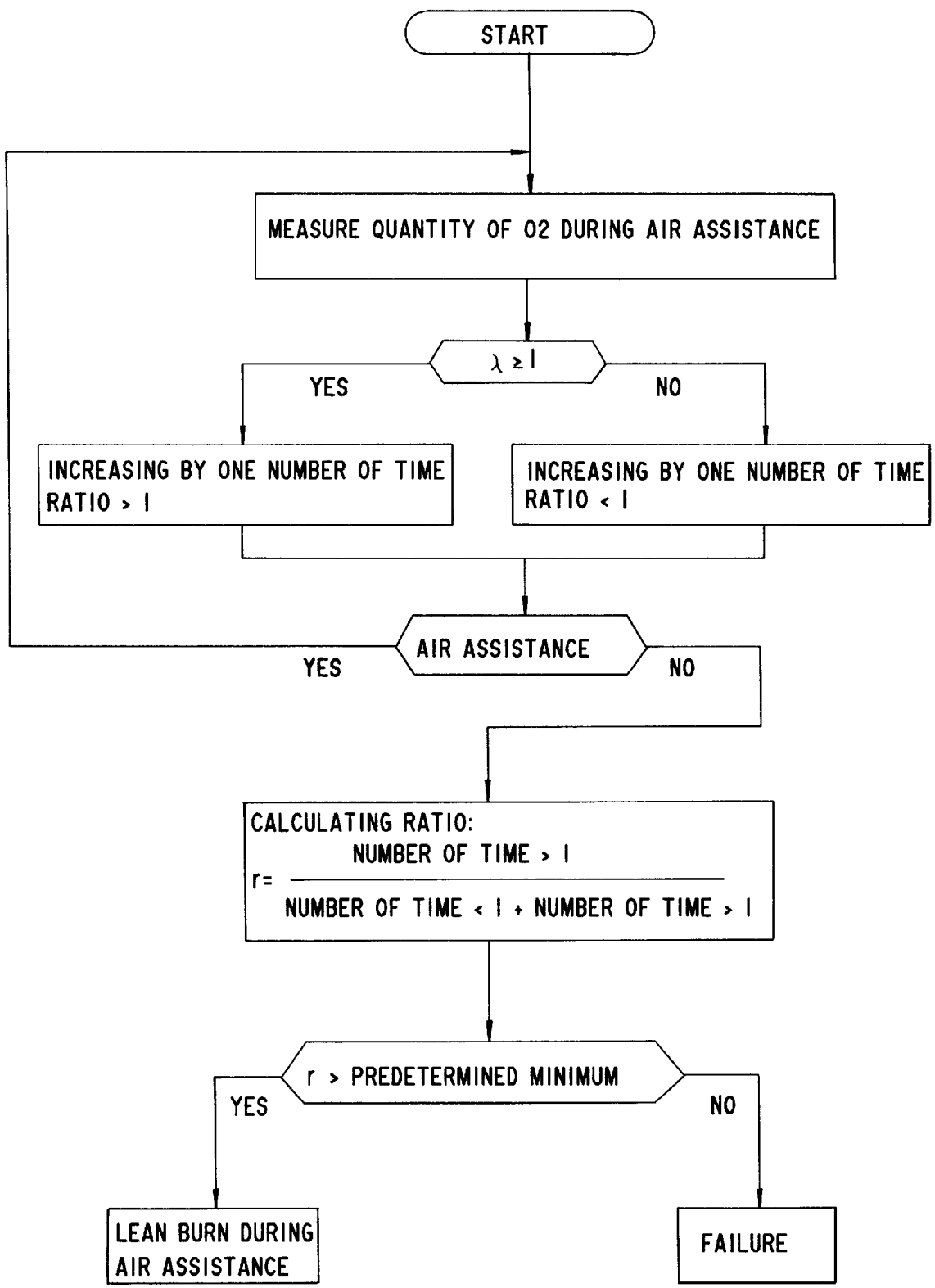

FIG. 4 is a flow diagram of process steps for evaluating the air assistance system; and FIG. 5 is flow diagram of a second series of process steps for evaluating the air assistance system.

According to the embodiment represented in FIG. 1, an engine 11 includes a cylinder 12 in which a piston 13 is slide-mounted. Classically, the cylinder 12 is connected to an intake manifold 14 on the one hand, and to an exhaust manifold 15 on the other hand.

Inside the intake manifold 14, in immediate proximity to an intake valve 16, is a fuel injector 17 of the known type. This injector is supplied with air by a line 18 controlled by an air assistance valve 19 of the all or nothing type. In a way that is known, this valve 19 is controlled by a computer 20. The air taken in by this air assistance line 18 is ambient air (arrow F, FIG. 1) filtered in the standard way by an air filter 21.

The ambient air, after being filtered by the filter 21 is also admitted into the intake manifold 14. In a known way, the air admitted into the manifold 14 is adjusted by a butterfly valve 22 before it reaches the level of the nozzle 17a of the injector.

An idle adjustment circuit establishes a branch 23, which bypasses the butterfly valve 22. An idle adjustment valve 24 is mounted in this branch 23 so as to adjust the flow of air circulating in the branch.

In a way that is known, means 30 for measuring the intake pressure are provided downstream from the butterfly valve 22. Means of this type make it possible to quantify the quantity of air entering the intake manifold.

A second line 25 called the oil vapor recovery line is also diagrammed in FIG. 1.

It will be noted that the air assistance valve 19 also controls the injectors of the other cylinders of the engine. To this end, air assistance lines 18a, 18b, 18c also lead to these injectors (not shown). It is assumed that the internal combustion engine equipped with the injection air assistance system has four cylinders. Quite obviously, this engine can have more or fewer cylinders without departing from the scope of the present invention.

The process according to the invention makes it possible to verify that the air assistance system (which includes the assistance valve 19 and the line 18) is operating correctly, and that a predetermined quantity of air can be injected at the level of the injector nozzle.

To this end, when the engine is not in the air assistance phase (start-up phase), the process according to the invention and diagrammatically shown in FIG. 4 consists of:

ensuring that the engine is in a stabilized idle phase. In order to do this, it is verified that the speed N of the engine is lower than a threshold speed Nc for a predetermined amount of time, and that the temperature T of the engine is higher than a temperature known as the start-up temperature. This start-up temperature is the theoretical temperature reached by the engine at which it may be considered that the engine is no longer in the start-up phase.

opening the air assistance valve 19.

measuring the quantity of air Qm passing through the idle adjustment valve 24 during a predetermined time interval t1.

comparing this quantity of air Qm to a pre-established limit air quantity.

deducing whether the assistance system is operating correctly.

A detailed explanation of the process defined above is given below.

In order to verify whether the air assistance system is operating correctly, it would be necessary to be able to measure the quantity of air passing through the valve 19 and the line 18 and to compare it with a theoretical quantity of air which corresponds to a supply without any leaks or obstructions in the air assistance system. For this reason, means for measuring the quantity of air passing through the air assistance system would be necessary. However, one of the objects of the present invention is not to add any measurement means beyond those which already exist.

Advantageously, according to the invention, the means for measuring and controlling the idle adjustment (already present in any electronically controlled engine) are used indirectly to measure the quantity of air passing through the air assistance system.

In effect, when an engine is running at a stabilized idle speed, the air intake butterfly valve 22 is closed and therefore the idle adjustment valve 24 adjusts the total air flow arriving in the intake manifold 14.

At a stabilized idle speed, the idle adjustment valve 24 is controlled by the computer 20. This computer causes the opening or the closing of the adjustment valve 24 by continuously calculating its Cyclical Opening Ratio (RCO). Classically, this cyclical opening ratio is a function of the difference between the actual speed N of the engine and the set-point idle speed Nc. This ratio RCO includes a proportional, an integral, and a derivative term. The actual speed of the engine N is measured continuously by an appropriate sensor, which transmits this information in the usual way to the computer 20. The set-point idle speed Nc was established on a test bench during the adjustment of the engine.

The integral term of the Cyclical Opening Ratio (RCO) is equal to:

$$\int_{t0}^{t1} (Nc - N)dt.$$

This term represents the quantity of air passing through the idle adjustment valve during a predetermined time interval (t1).

Determining the value of this term at the end of a time interval t1 makes it possible to know the quantity of air which has passed through the idle adjustment valve during this time interval t1.

Once this fact is known, the quantity of air passing through this idle adjustment valve is determined so that the quantity of air passing through the air assistance valve can be deduced from it.

Thus during the adjustment of the engine, the value of the integral is noted at the end of a time interval t1, when the engine is running at a stabilized idle speed (air assistance valve 19 closed). The value of this integral is stored in the memory of the computer 20 under the name idle air quantity Qr. It will be noted that in this case, all of the air admitted into the cylinder 12 passes through the idle adjustment valve. By measuring the integral of the RCO when the air assistance valve is closed, it is possible to know the maximum quantity of air admissible by the cylinder 12 when running at idle.

At a second time, when the engine is still on a test bench and running at a stabilized idle speed, the air assistance valve 19 is opened for the same time interval t1. In this case, the air directed toward the cylinder 12 passes through the idle branch 23, but also through the air assistance line 18. The total quantity of air which must pass through the set of lines 18 and 23 is the quantity of air Qr (already measured) supplied to the engine at the idle speed.

The quantity Ql, known as the limit air quantity, which passes through the idle adjustment valve when the air assistance valve 19 is open during the time interval t1, is measured and stored. This quantity is measured as before, by determining the value of the integral of the RCO after the time interval t1.

It is known that the quantity of air Qa which has passed through the air assistance line 18 is provided by the following formula:

$$Qa=Qr-Ql.$$

Thus, without directly measuring the quantity of air which has passed through the air assistance valve 19, this quantity may be successfully determined.

Of course, in order to be able to make a diagnosis of the proper functioning of the air assistance system, it is not enough to measure the quantity of air passing through the air assistance valve; it is also necessary to compare this quantity of air to a reference value. Up to now, all of measurements performed (Qr, Ql) have been on a test bench, while it was certain that the air assistance system was operating correctly. Because of this, the value Ql measured is the reference value which represents the quantity of air passing through the idle adjustment valve when the air assistance system is operating correctly.

When the engine is in normal operation (installed in a vehicle and no longer on a test bench) and when it is running at a stabilized idle speed, the air assistance valve 19 is opened. Simultaneously, a value corresponding to the quantity of air Qa passing through the air assistance valve is subtracted from the integral RCO. This quantity of air is known and was determined when the engine was on the test bench. Next, at the end of the time interval t1, the value Qm (the quantity of air measured while passing through the idle adjustment line) is determined. This measured value Qm is compared with the integral of the RCO. Since the value Qa has already been subtracted from this integral, the value of the integral is directly equal to Qr−Qa.

Note that Qr−Qa=Ql (Ql has already been determined on the test bench and is the limit reference value). If Qm is greater than or equal to Ql, it is deduced from this that the air assistance system is operating (that is, it does not have any leaks or obstructions). In the opposite case, a non-operation code for the air assistance system is sent to the computer, which informs the driver of it by any appropriate means.

Thus, by performing a measurement of the quantity of air Qm passing through the idle adjustment line during the time interval t1, when the engine is running at a stabilized idle speed, it is possible to determine whether or not the air assistance system is functioning correctly.

The value Ql (the limit air quantity passing through the idle adjustment line when the engine is running at a stabilized idle speed and when the air assistance valve is open) can also be acquired before each measurement of the quantity of air Qm (air assistance valve open). In this case, the value Ql is acquired during the normal operation of the engine, that is, not just during the adjustment of the engine on the test bench. Thus, if wear on the mechanical elements of the vehicle causes the limiting air quantity Ql to vary, this is taken into account in the diagnosis of the proper operation of the air assistance system. So there is a process for learning the limiting value Ql.

The above-mentioned process can also be implemented in the case in which the means 30 for measuring the air intake are placed immediately after the filter 21. This case is illustrated in FIG. 2.

It will be noted that the measurement of Qm (that is, the diagnosis of the proper operation of the air assistance) is halted if:

the engine is no longer in an idle adjustment mode, and
if a load which could disturb the idle adjustment is applied (for example turning on the air conditioning, etc.).

Preferably (whether in the scope of the embodiment represented in FIG. 1 or in FIG. 2), the verification of the absence of leaks or obstructions in the line 18 and the valve 19 is completed by verifying that during the start-up phase, the engine is burning a mixture known as a lean mixture. In effect, the pollution rate of the engine at start-up is reduced if a lean mixture is used, simply because the catalyst goes into action more rapidly. FIG. 3 represents the efficiency curve of the catalyst as a function of its temperature. The curve j represents the efficiency of the catalyst when the mixture burned is "rich" and the curve i represents the efficiency of the catalyst when the air/fuel mixture burned is "lean."

It is apparent from these two curves that there is an advantage to running on a lean mixture during the start-up phase of the engine, in order to activate the efficiency of the catalyst more rapidly. It will be noted that a 50% efficiency of the catalyst is reached 50° C. earlier when a lean mixture is burned. Thus, a gain of 50° C. represents almost a 30% gain in the starting time of the catalyst.

The result is that a direct way to verify that the air assistance system is operating properly and has attained its object of reducing the pollutants emitted is to ensure that the mixture to be burned is lean.

To this end, during the start-up phase, and as soon as a probe for measuring the quantity of oxygen 31 is active, the richness $\lambda$ of the mixture is measured. This probe exists in all electronically controlled vehicles and does not need to be added specifically for this measurement. In order for the mixture to be called lean, the richness $\lambda$ measured by the probe 31 must be less than 1.

As soon as this probe is active, and during the entire remaining duration of the injection air assistance phase, the richness $\lambda$ of the mixture is measured by sampling. Then, the ratio of the number of times the richness was found to be less than 1 over the number of times the richness was measured is calculated. If this ratio is greater than a predetermined value, it is deduced from this that the engine did in fact run on a lean mixture, and thus that the air assistance system did function properly and achieve its object of reducing the pollutants emitted. For example, if the engine ran more than 70% of the time on a lean mixture (during the start-up phase), the air assistance system is considered to be operating correctly. The above noted process steps are shown diagrammatically in FIG. 5.

It will be noted that the engine cannot actually run entirely (100%) on a lean mixture during the air assistance phase. In fact, during this start-up phase, the driver, except when at a stop and idling, will rev his engine, thereby causing fuel enrichments of the mixture to be burned.

It must be noted that the monitoring of the richness $\lambda$ of the mixture can be carried out in a way that is complementary to the verification of the absence of leaks and/or obstructions in the air assistance system. These two verifications can be carried out independently from one another.

The proper operation of the air assistance system guarantees good atomization of the jet of fuel injected and consequently better combustion and less pollution.

Running on a lean mixture during the start-up phase of the engine guarantees a decrease in the emanations of pollutants, since the catalyst operates more rapidly. Thus, the starting time for the catalyst is reduced.

It is understood that the present invention is not limited to the modes of embodiment described, but encompasses any variant within reach of one skilled in the art. In particular, the measurement of the quantity of air passing through the idle adjustment line can be performed by any appropriate means and not just by monitoring the integral of the cyclical opening ratio of the idle adjustment valve.

I claim:

1. A method of monitoring a proper operation of an air-assisted injector of an internal combustion engine, wherein the injector is adapted to deliver a predetermined quantity of fuel to the engine, and the engine is operated in an air assistance phase, during which an additional amount of air is supplied to the engine, and in a stabilized idle phase, during which the engine is operated at a substantially constant speed, the process which comprises:

verifying a posteriori, during a stabilized idle phase of the engine, whether a predetermined quantity of air provided by an air assistance system can be supplied to the engine during the air assistance phase.

2. The method according to claim 1, which further comprises: ascertaining that the internal combustion engine is supplied with a lean air/fuel mixture during the air assistance phase.

3. The method according to claim 2, wherein the ascertaining step is performed during the air assistance phase.

4. The method according to claim 3, wherein a quantity of oxygen is measured with an exhaust probe which becomes operational during the air assistance phase, and the ascertaining step comprises, during the air assistance phase and as soon as the probe becomes operational:

determining whether a richness ratio of the injected air/fuel mixture is less than 1 or greater than 1;

sampling a plurality of measurements during the air assistance phase and determining a number of times during which the richness ratio was less than 1 and a number of times during which the richness ratio was greater than 1;

calculating a ratio corresponding to the number of times the richness ratio was less than 1 divided by a number of measurements sampled in the sampling step; and if the ratio is greater than a predetermined minimum ratio, deducing that the engine was supplied with a lean mixture during the air assistance phase.

5. The method according to claim 4, which further comprises, if the ratio is less than the predetermined minimum ratio, transmitting a code to the engine control indicating a failure of the air assistance system.

6. The method according to claim 1, wherein the air assistance system includes an air assistance valve and an idle valve, and the method comprises:

defining the stabilized idle phase of the engine when the engine is running at idle speed for a predetermined time and when the engine is at an operating temperature (T) higher than a start-up temperature of the engine;

opening the air assistance valve;

determining a quantity of air passing through the idle valve during a predetermined time interval;

comparing the determined quantity of air with a predetermined setpoint quantity of air; and deducing from a result obtained in the comparing step whether the air assistance system is operating properly.

7. The method to claim 6, wherein the engine has an engine control and wherein the method further comprises, if the determined quantity of air is less than the predetermined setpoint quantity of air, transmitting a code to the engine control which indicates a failure of the air assistance system.

8. The method according to claim 6, wherein the step of determining the quantity of air passing through the idle adjustment valve comprises taking into account an integral appearing in a calculation of a cyclical opening ratio of the idle adjustment valve.

9. In combination with an internal combustion engine having an air-assisted injector adapted to deliver a predetermined quantity of fuel to the engine, and the engine is operated in an air assistance phase, during which an additional amount of air is supplied to the engine, and in a stabilized idle phase, during which the engine is operated at a substantially constant speed; a device for monitoring a proper operation of the air-assisted injector, comprising:

means for verifying a posteriori, during a stabilized idle phase of the engine, whether a predetermined quantity of air can be supplied to the engine during the air assistance phase, said verifying means including an air assistance valve and means for opening said air assistance valve;

means for ascertaining that the engine is operated at a stabilized idle speed for a predetermined period of time;

an idle adjustment valve and means for determining a quantity of air passing through said idle adjustment valve;

a comparator for comparing the quantity of air passing through said idle adjustment valve with a predetermined setpoint quantity of air; and a monitor for monitoring a richness $\lambda$ of the air/fuel mixture during the air assistance phase.

* * * * *